United States Patent [19]

Higgins

[11] Patent Number: 4,815,645
[45] Date of Patent: Mar. 28, 1989

[54] RETRACTABLE HOSE GUIDE

[76] Inventor: Paul D. Higgins, P.O. Box 314, Mason, Mich. 48854

[21] Appl. No.: 61,718

[22] Filed: Jun. 15, 1987

[51] Int. Cl.4 ............................................. B65H 57/14
[52] U.S. Cl. .................................. 226/197; 242/157 R
[58] Field of Search .............. 226/196, 197, 198, 199; 254/389, 390, 393, 405, 406, 413, 415; 242/157 R; 239/201, 276, 280, 281

[56] References Cited

U.S. PATENT DOCUMENTS

| 1,612,135 | 12/1926 | Lorraine | 239/276 X |
|---|---|---|---|
| 1,831,306 | 11/1931 | Kakimoto | 226/197 |
| 1,968,357 | 7/1934 | Schmiett | 226/197 |
| 2,264,751 | 12/1941 | Maxton-Graham | 226/197 |
| 2,501,407 | 3/1950 | Olsen et al. | 226/197 |
| 2,618,465 | 11/1952 | Austin, Jr. | 226/197 |
| 2,657,012 | 10/1953 | Whitlock | 226/197 |
| 2,846,189 | 8/1958 | MacLaughlin | 226/197 |
| 2,974,933 | 3/1961 | Belanger | 226/197 |
| 3,081,978 | 3/1963 | Kaufmann | 226/197 |
| 3,193,205 | 7/1965 | Hanson | 239/201 X |
| 3,249,337 | 5/1966 | Neumann | 226/197 |
| 3,829,065 | 7/1974 | Less | 226/197 |
| 4,347,800 | 9/1982 | Culver | 254/415 X |
| 4,452,386 | 6/1984 | McElyea | 226/197 |
| 4,603,649 | 8/1986 | Hystad | 254/389 X |

Primary Examiner—Joseph J. Hail, III
Attorney, Agent, or Firm—Beaman & Beaman

[57] ABSTRACT

A guide for garden hose to guide the hose during movement over the lawn. The guide has a nonuse condition fully retractable below the lawn level, and in use includes a roller elevated above the lawn level for engaging a hose moving thereover. Detent structure maintains the guide roller in the elevated position.

11 Claims, 1 Drawing Sheet

RETRACTABLE HOSE GUIDE

BACKGROUND OF THE INVENTION

Guides for garden hose prevent the hose from damaging flowers, shrubs and plantings as the hose is moved about the lawn, and particularly, when being pulled around a corner. Typical examples of hose guides are shown in U.S. Pat. Nos. 1,968,357; 2,264,751; 2,618,465; 3,829,065 and 4,452,386.

While known hose guides as shown in the aforementioned patents utilize rollers to facilitate movement of the hose across the guide without imposing undue wear or stress on the hose, known devices of this type are permanently or temporarily inserted into the ground at the location desired and the roller member extends above the lawn level. The presence of the hose guide above the ground level creates a hazard due to the danger of stumbling thereover, and such hose guides must be removed when mowing the adjacent grass, or mowed around, requiring additional grass trimming.

It is an object of the invention to provide a guide for garden hose wherein the hose-engaging member is retractable below the lawn level in a nonuse condition, and may be readily extended and elevated to a usable position.

A further object of the invention is to provide a retractable hose guide utilizing a roller wherein the roller is retractable below the lawn level in a nonuse position, and may be elevated to a usable position with little effort requiring no special skills on the part of the user.

Yet another object of the invention is to provide a retractable garden hose guide which may be readily installed with ordinary skills, is of economical construction, noncorrodible, and which is maintenance free.

In the practice of the invention a housing in the form of a hollow stake is inserted into the lawn at the desired location. An elongated cylindrical roller-supporting member is located within the stake interior and may be axially displaced therein between a retracted position wherein the member is substantially entirely located within the stake, or may be extended to an elevated position wherein much of the member extends from the stake above the lawn level.

A roller is rotatably mounted upon the upper regions of the member for engaging the hose to be guided, and a cap or handle is mounted upon the upper end of the roller to permit the roller and support member to be elevated.

Detent structure is located upon the roller-supporting member and the stake to retain the member and roller in the elevated position, and a detent is also used to retain the member in the retracted position.

The roller member cap is shaped to facilitate grasping from above, and a radially extending flange is defined on the stake to minimize the likelihood of the stake being overgrown by grass. Additionally, wings in the form of gussets are defined on the stake to prevent stake rotation, and barbs are defined on the stake lower end to resist withdrawal.

Preferably, all of the components of the hose guide of the invention are formed of a noncorrodible synthetic plastic material which may be economically molded and shaped as desired.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
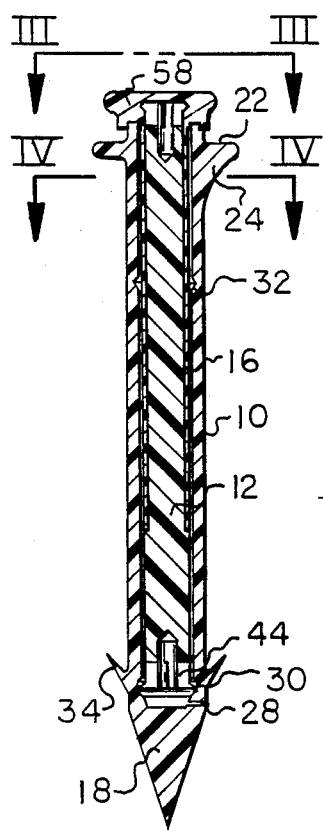
FIG. 1 is an elevational, sectional view of the hose guide in accord with the invention, the roller support member being illustrated in the retracted position.

The hose guide of the invention consists of three components, all preferably formed of a noncorrodible, synthetic, plastic, moldable material. The components include the housing or stake 10, the roller support member 12, and the combination roller and cap 16.

The stake 10 is of an elongated configuration having a lower pointed end 18 and an upper end 20. An outwardly radially extending flange or rim 22 of a diameter significantly greater than the diameter of the main body of the stake is defined on the stake adjacent end 20. Three axially extending gussets or wings 24 extend between the stake main body and the underside of the flange 22 for reinforcing the flange and preventing rotation of the stake.

Internally, the stake 10 includes an axially extending cylindrical bore 26 having a drain hole 28 defined at its lower end. The bore includes an annular recess 30 adjacent its lower end, and axially spaced thereabove is an annular groove or recess 32 which defines the roller extending position, as later described.

Preferably, several barb-like projections 34 are homogeneously defined upon the lower end of the stake 10 and extend at an oblique upward angle, and the purpose of these projections is to resist vertical removal of the stake from the ground.

The roller support member 12 is of an elongated configuration having a lower cylindrical diameter 36 of a greater diameter than the member upper diameter 38. Radial shoulder 40 defines the transition between diameters 36 and 38.

At its lower end, the member 12 is provided with homogeneous fingers 44 each having an outwardly extending lip 42 which form a detent, the central bore 46 being axially slit to form the fingers and permit inward radial deflection of the fingers.

Similar detent structure is defined at the upper end of the member 12 wherein lip 48 is formed on fingers 50 defined by slit bore 52 to provide a plurality of inwardly deformable fingers.

The combination roller and cap member 16 is of a general tubular configuration having an outer cylindrical surface and an inner bore 54 of a diameter slightly greater than the diameter 38 of member 12. The lower end 56 of the roller member 16 is squared.

At its upper end the member 16 includes a cap 58 of generally circular form having an undercut portion 60 to permit ready grasping of the cap from above. Internally, the cap is provided with an enlarged recess 62 concentric with the axis of the roller and in communication with bore 54.

Assembly of the hose guide in accord with the invention is readily accomplished. The upper end of the roller support member 12 is inserted into the lower open end of the roller 16 until the fingers 50 snap into the cap recess 62. The fit between the fingers 50 and the cap recess 62 is such that the combination roller and cap 16 is readily rotatable on the member 12, but relative axial displacement between these components is prevented.

Thereupon, the assembled member 12 and roller 16 is inserted downwardly into the upper end of the stake 10. As these components are inserted into the stake bore 26 the fingers 44 will engage and snap into the rounded groove 32, and sufficient axial force is exerted on the cap and roller member 16 to push the member 16 beyond the groove 32 by deforming the fingers 44 inwardly permitting them to slide out of the groove.

Insertion of the member 12 and roller 16 continues until the fingers 44 engage the recess 30.

Figure 2:
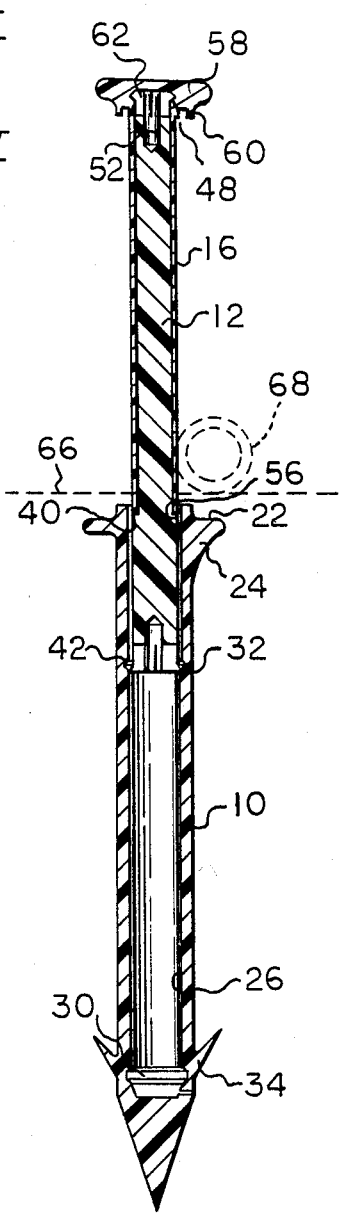
FIG. 2 is an elevational, sectional view of the hose guide illustrating the roller support member in the elevated extended position, a garden hose being shown in dotted lines.
Figures 5, 6, 7:
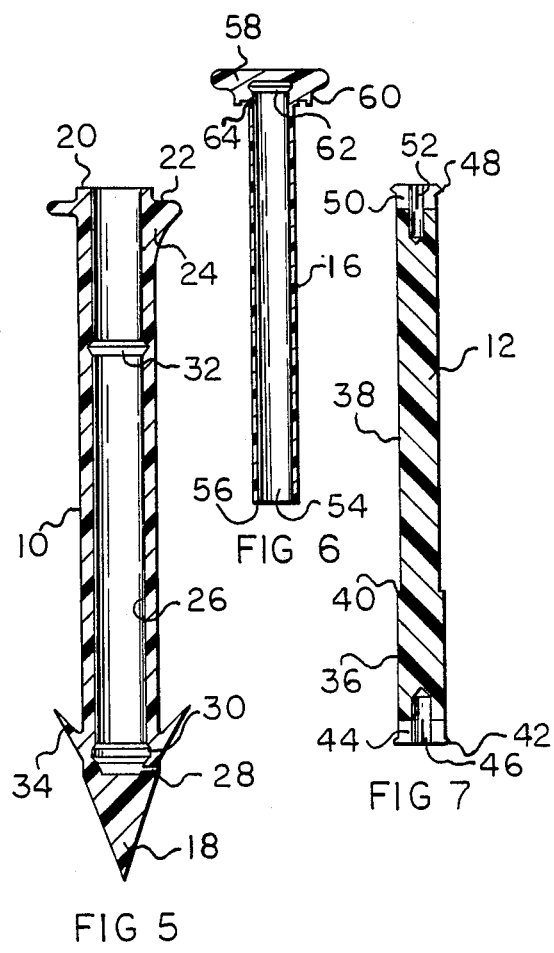
FIG. 5 is an elevational, sectional view of the housing stake, per se.
FIG. 6 is an elevational, sectional view of the roller and cap member, per se.
FIG. 7 is an elevational, sectional view of the roller supporting member, per se.
Figure 3:
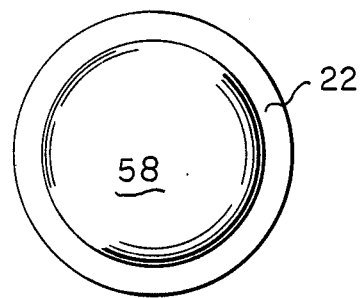
FIG. 3 is a plan view as taken along Section III—III of FIG. 1.
Figure 4:
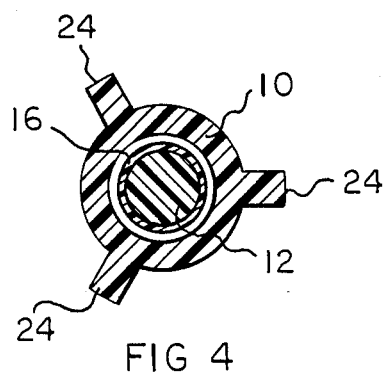
FIG. 4 is a plan, sectional view as taken along Section IV—IV of FIG. 1.

Thereupon, the hose guide is fully assembled and may be inserted into the lawn at the desired location. The underside of the cap 58 is provided with an annular recess 64 receiving the upper end 20 of the stake 10 and in this manner the cap directly engages the stake upper end. Thus, light tapping on the cap 58 will drive the stake into the ground without damage to the components. The stake 10 is inserted into the ground to an extent wherein the cap upper surface will be located at, or slightly below, the level of the grass as indicated at 66 in FIG. 2.

When it is desired to use the hose guide to prevent the hose from being pulled over flowers, bushes, or the like, the user grasps the cap 58 and axially pulls the cap upwardly. This force deforms the fingers 44 inwardly permitting the member 12 and roller 16 to be elevated to the position shown in FIG. 2. At this position the fingers 44 will engage the recess 32 indicating to the operator that further axial movement or pull on the cap is not required. At this axial position of the roller, the roller 16 will be accessible to a hose 68 resting upon the lawn surface, and the guide will maintain the hose at the desired position as the hose is moved about the lawn.

The roller and cap member 16 is freely rotatable upon the member 12 reducing wear on the hose as the hose is pulled about the guide, and the rotatable aspect of the roller reduces the force necessary to pull the hose.

After use, the roller member 12 and roller 16 are retracted to the nonuse position of FIG. 1 merely by pushing downwardly on the cap 58 causing the fingers 44 to deform inwardly as they ride out of the recess 32 and the cap and roller 16 continues to be pushed downwardly until the fingers 44 engage the groove 30.

Accordingly, it will be appreciated that the above described hose guide accomplishes the desired objects of the invention. Assembly of the guide may be readily accomplished by unskilled workers, the operation requires no special skills, and the apparatus is economically manufactured. When in the retracted position, the hose guide forms no obstacle in the lawn to the passerby, and lawn mowers will readily pass thereover without damaging the guide. If frost should slightly elevate the guide during the winter, the desired position of the stake is easily achieved by merely stepping upon the cap 58.

It will be appreciated that various modifications to the inventive concepts may be apparent to those skilled in the art without departing from the spirit and scope of the invention.

I claim:

1. A retractable guide for garden hose comprising, in combination, a housing adapted to be embedded in the ground below ground level, hose engaging means mounted upon said housing movable between an extended position wherein said means is located above the ground level and a retracted position wherein said means is located below the ground level, and radially displaceable retaining detent means mounted on one of said housing or said hose engaging means interposed between said housing and said hose engaging means for producing a radial force engaging the other of said housing or said hose engaging means such that the force maintains said hose engaging means in said extended position.

2. In a retractable guide for garden hose as in claim 1, said housing comprising an elongated stake having a lower pointed end and an upper end, said stake being inserted into the ground with said upper end disposed below the ground level, an axially extending bore defined in said stake intersecting said stake upper end, said hose engaging means being axially displaceable within said bore, an upper end defined on said hose engaging means, and a cap located on said hose engaging means upper end.

3. In a retractable guide for garden hose as in claim 2, said hose engaging means including an elongated support member and a tubular roller rotatably mounted upon said member for engagement with the hose being guided when said hose engaging means is in said extended position 4. In a retractable guide for garden hose as in claim 3, an annular radially, outwardly extending flange defined on said stake upper end.

5. In a retractable guide for garden hose as in claim 4, a plurality of radially extending wings defined on said stake, said wings resisting rotation of said stake about its longitudinal axis.

6. In a retractable guide for garden hose as in claim 5, said wings comprising gussets homogeneous with said stake engaging said flange to reinforce said flange.

7. In a retractable guide for garden hose as in claim 2, said cap having a peripheral edge, said peripheral edge being of an undercut configuration to facilitate grasping of said cap for raising said hose engaging means to its extended position.

8. In a retractable guide for garden hose as in claim 3, said support member being of an elongated configuration having a lower end, a detent defined on said member lower end and first detent receiving means defined on said stake intersecting said stake bore, said detent and detent receiving means comprising said retaining means for maintaining said hose engaging means in said extended position.

9. In a retractable guide for garden hose as in claim 8, second detent receiving means defined on said stake intersecting said stake bore, said detent being received within said second detent receiving means when said hose engaging means is in said retracted position.

10. In a retractable guide or garden hose as in claim 9, said detent comprising resilient fingers defined on a support member lower end and said first and second detent receiving means comprising axially spaced recesses defined in said stake bore.

11. A retractable guide for garden hose comprising, in combination, a housing adapted to be embedded in the ground below ground level, hose engaging means mounted upon said housing movable between an extended position wherein said means is located above the ground level and a retracted position wherein said means is located below the ground level, retaining means interposed between said housing and said hose engaging means for maintaining said hose engaging means in said extended position, said hose engaging means including a rotatable elongated roller for engagement with the hose being guided.

* * * * *